Nov. 18, 1969  A. W. HUGHES  3,478,797
PREPARING SAUSAGE BATTER FOR COOKING AND COOLING
Filed June 15, 1966  4 Sheets-Sheet 1
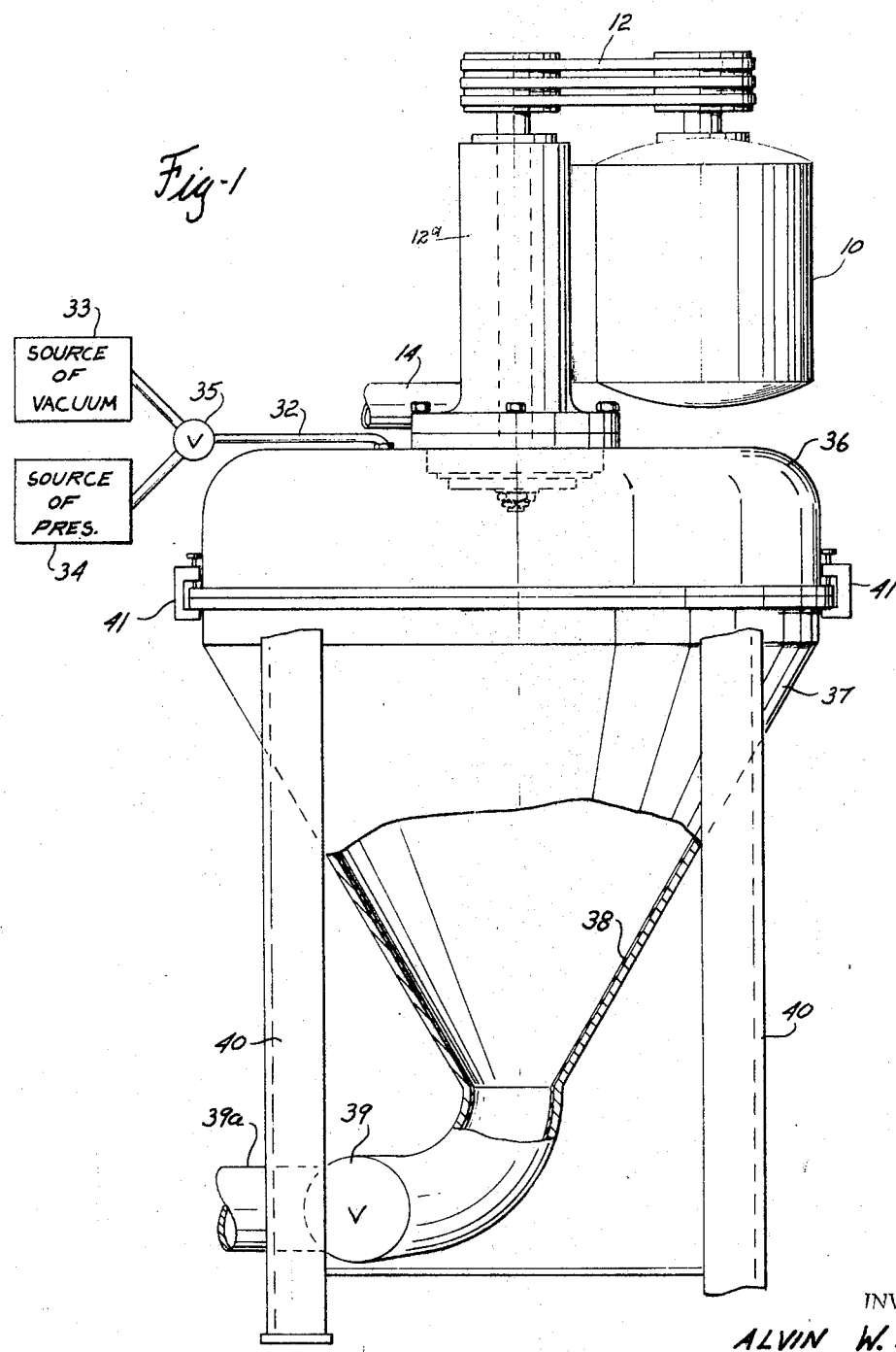
INVENTOR.
ALVIN W. HUGHES
BY H. R. Johns
ATTORNEY

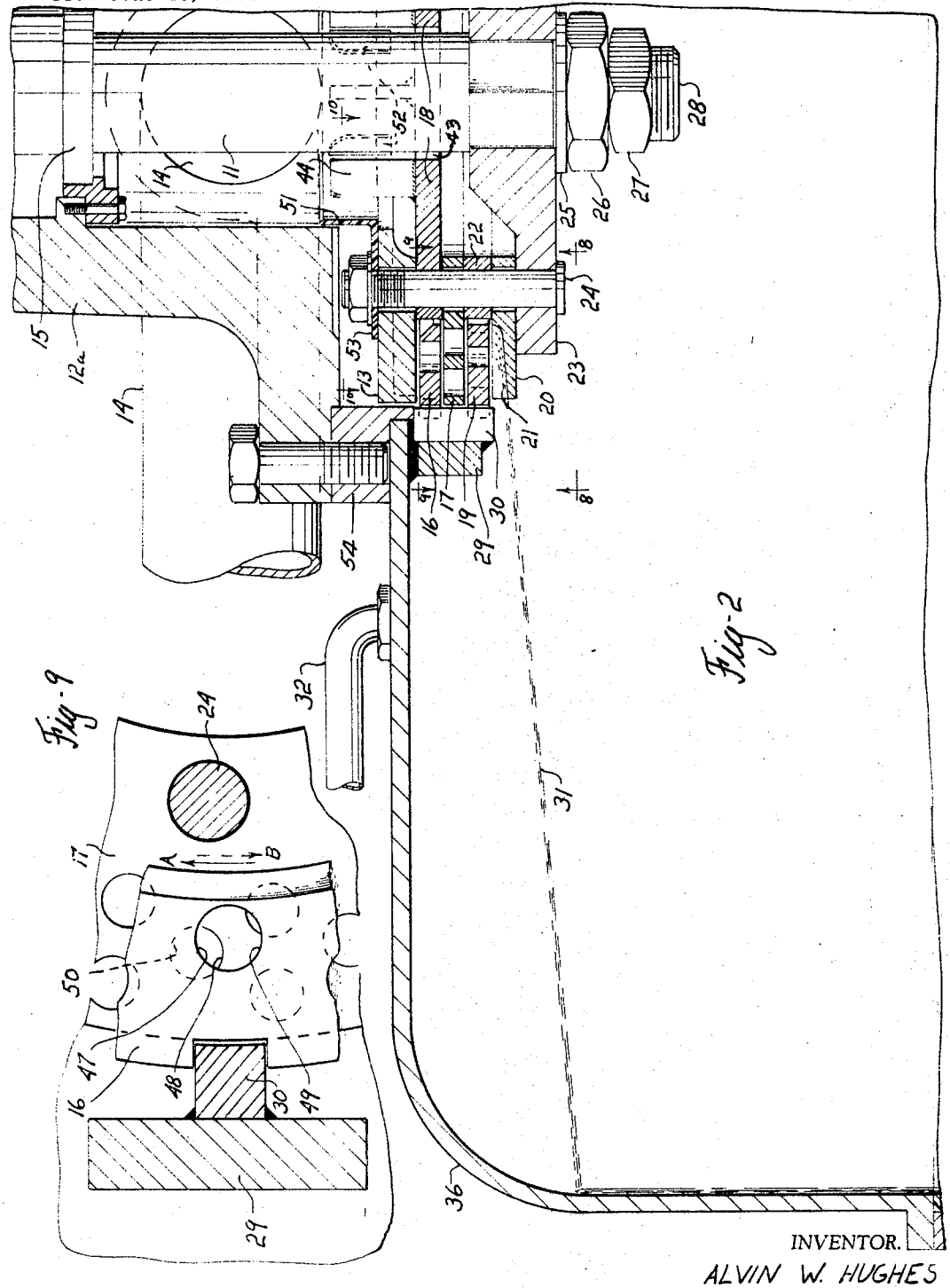

Nov. 18, 1969  A. W. HUGHES  3,478,797
PREPARING SAUSAGE BATTER FOR COOKING AND COOLING
Filed June 15, 1966  4 Sheets-Sheet 3
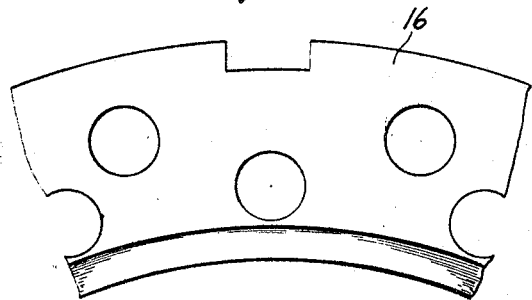
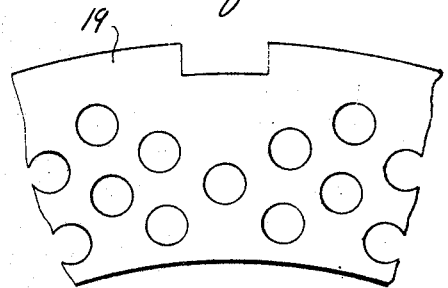
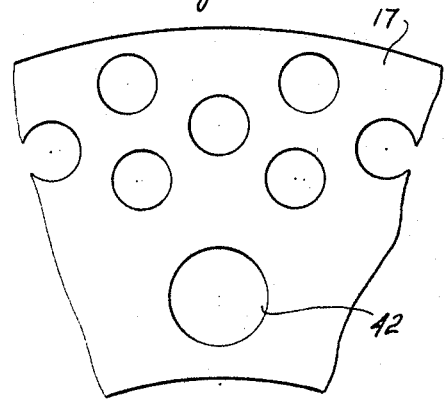
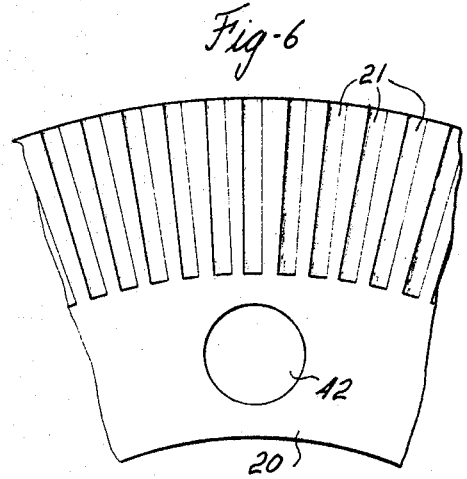
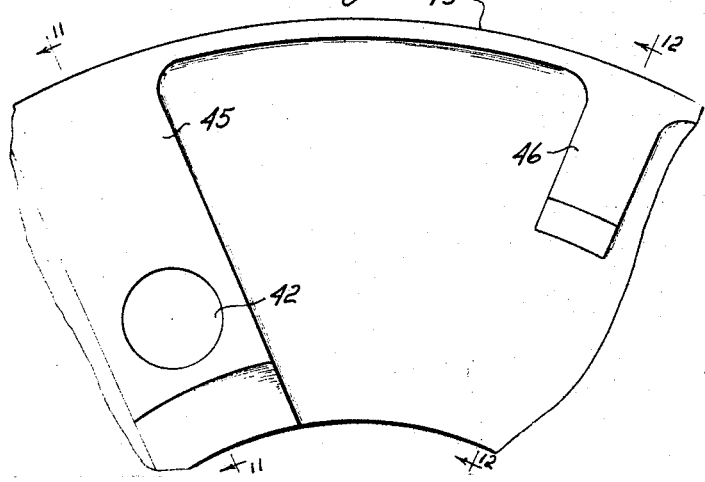
INVENTOR.
ALVIN W. HUGHES
BY
ATTORNEY Nov. 18, 1969     A. W. HUGHES     3,478,797
PREPARING SAUSAGE BATTER FOR COOKING AND COOLING
Filed June 15, 1966     4 Sheets-Sheet 4
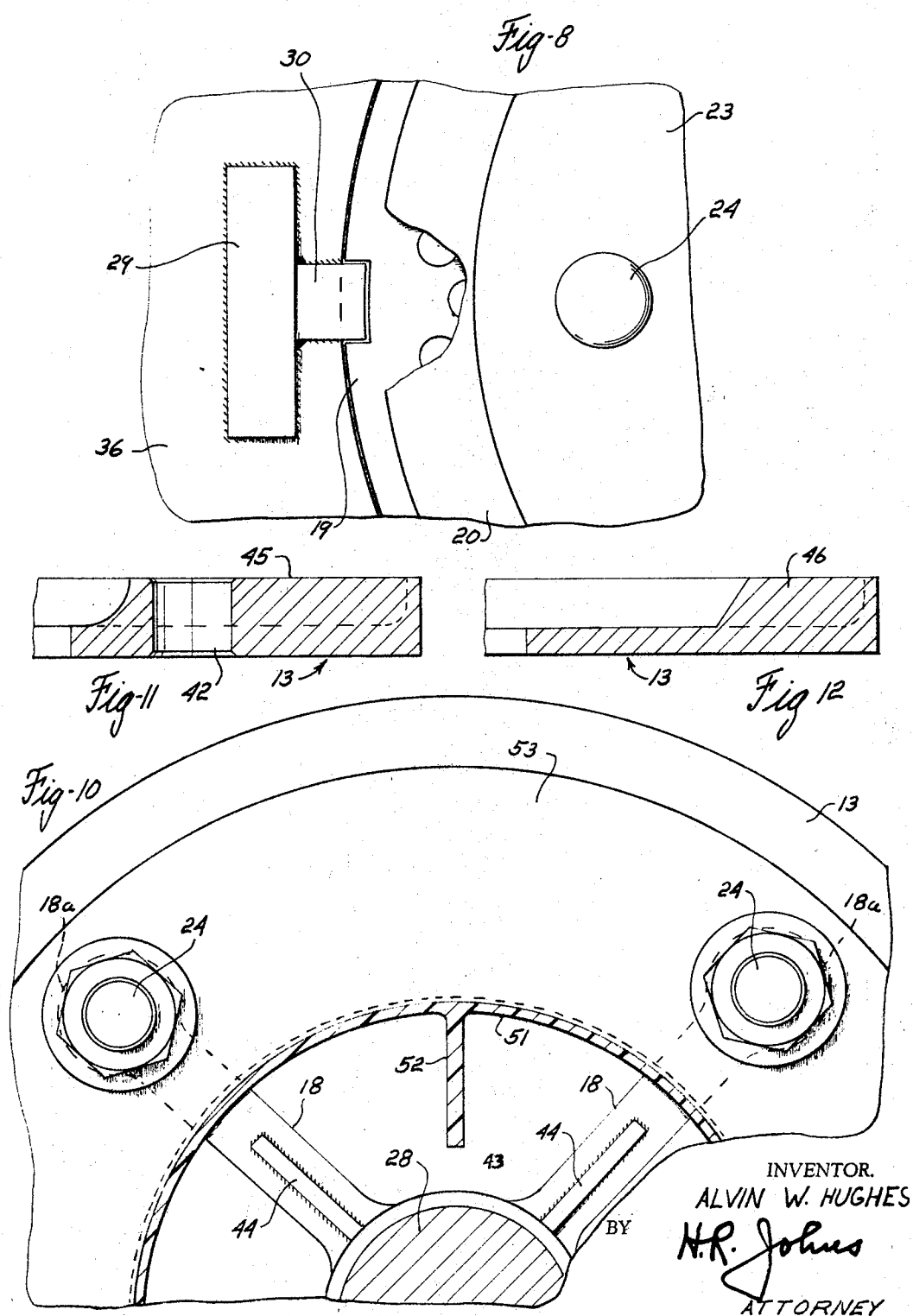

United States Patent Office 3,478,797
Patented Nov. 18, 1969

3,478,797
PREPARING SAUSAGE BATTER FOR
COOKING AND COOLING
Alvin W. Hughes, 4 N. 194 Church Road,
Bensenville, Ill. 60106
Continuation-in-part of application Ser. No. 401,157,
Oct. 2, 1964. This application June 15, 1966, Ser.
No. 557,801
Int. Cl. A01f 7/02; A23k 3/02
U.S. Cl. 146—192                              17 Claims

ABSTRACT OF THE DISCLOSURE

An emulsifier for sausage batter and the like is located in an upper portion of a large vacuum housing but is more efficiently arranged to reduce mechanical heat input into batter by avoiding heat input from direct impact upon a stack or housing wall located close to a discharge ring before the vacuum has had a chance to expand the tiny air particles enough for their release. It has been discovered that the output from a discharge ring of said emulsifier when located in an upper portion of a large vacuum housing possesses enough energy both centrifugal and suction to throw batter particles through the vacuumized environment far enough to increase the thermal conductivity enough and reduce the hazard of the batter "oiling out" during cooking, with the batter density increased to over 1, a previously considered safe level. By the simple expedient of reversing the direction of the rotatable rings, the effective life of said emulsifier has been substantially doubled without having to grind any of the effective shearing edges. Incidentally the better study of the mechanical heat input to the batter under this invention has succeeded in eliminating more than 10 horsepower of energy previously thought necessary to be put into the batter, as heat.

This invention is filed as a continuation-in-part of my prior application Ser. No. 401,157 filed Oct. 2, 1964 now patent No. 3,334,674 dated Aug. 8, 1967 for Combination Emulsifying and Deaerating Machine for Sausage Batter and the Like.

Background

The field of art to which this invention pertains is primarily the preparation of sausage emulsions, but should also be applicable to any material needing little or no mechanical heat input into the material. The prior patents known to me include:

Sloan et al. 2,681,279, dated June 15, 1954 relates principally to the use of an atmoshpere of an inert gas like nitrogen instead of the usual atmosphere containing oxygen, for the expectation of longer shelf life in the packaged sausage. Instead of shearing or shearing in suspension batter particles, Sloan et al. used a slicing or cutting of somewhat uncertain action as to the rate of rotation of his "rapidly rotating cutter knives" 7 (column 3, lines 14 and 15) but no shearing in suspension. Perhaps rotation of the bowl 6 became necessary because the speed of the knives 7 being so high as to tend to create voids in the plane of the knives.

The closest commercial prior patents to the A. W. Hughes patents and the present invention are believed to be the Schnell patents perhaps as exemplified by Schnell Reissue Patent 24,683, dated Aug. 18, 1959. This should illustrate some of the size and importance of the present invention, in that Schnell alleged 28,800 shearing cuts per minute at a speed of 3600 revolutions per minute (column 6, lines 30 to 33) with assistance of ice water (column 1, line 43). In contrast, this invention at about half that speed provides several thousand percent more opportunities for shearing sausage particles, yet needs no coolants. This present invention provides finer particles, the chief use of which resides in making possible more efficient deaeration of particles of sausage batter in a vacuum casing, deemed necessary because of the large amount of air incorporated in the form of tiny, almost microscopic air pockets which must of necessity, be near a surface of unusually small particles, thus making it easier to remove those pockets of air in a suitable vacuum. Reduced heat input to the sausage particles has been obtained by said "shearing in suspension" the sausage particles, i.e. without the heat generated by metal to metal rubbing contact of the shearing elements and their edges, as claimed in my prior Patent 3,221,788, dated Dec. 7, 1965 for Emulsifier.

Description of invention

The present invention has made possible a substantial reduction in the heat input to the batter along with a minimum expenditure for time and labor for deaeration as well as no coolants being needed to obtain a first and best reconciliation of the three factors of (a) extra fine comminution, (b) reduction of heat input to the batter during comminution and (c) attainment of a density of about 1.03 or more than enough to cause the batter to sink in water. My Patent 3,221,788 dated Dec. 7, 1965 is believed to have made an epochal advance in the art of comminuting and emulsifying sausage batter to obtain superfine particles without objectionable mechanically applied heat input. This has been obtained by shearing the batter particles in suspension i.e. without objectionable continued wiping contacts of the shearing elements. In the embodiment illustrated the shearing cuts are made at a rate of millions a minute to produce the unusually finely comminuted particles of batter. A reason prior heat input into the batter was objectionable is that in cooking it causes an instability of the emulsion resulting in an oiling out or breakdown of the emulsion.

Features contributing to the lower mechanical heat input have totalled enough to make it possible to use about a 30% smaller driving motor than had the prior practice due to some of the following:

(a) The largest cause of reduced heat input to the batter is believed to be due to the elimination of the high friction output impeller 61 in FIGURES 8 and 16 of patent 3,221,788, without eliminating its function of getting the emulsified batter out of the emulsifier. This has been accomplished by a rearrangement and simplification of the parts used.

(b) Another element causing excessive heat input comes from the unnecessary working and treatment of the emulsified batter in the centrifugal distributor 75 located below the emulsifier in my aforesaid pending parent application Ser. No. 401,157, filed Oct. 2, 1964, now Patent 3,334,674, dated Aug. 8, 1967. A way has now been discovered for the discharge ring 72 of this application to perform the work previously done by said distributor 75 of said parent patent, thus eliminating about 3 horsepower of heat input.

(c) Suction, or improved pressure difference created by a vacuum, assists centrifugal force in withdrawing the emulsified sausage batter from the slots in the discharge ring for flights in a vacuum, requiring slightly less mechanical heat input.

(d) Gravity assists instead of opposes movement of the batter through the sizing ring or rings. In my patent 3,221,788 and application Ser. No. 401,157, now Patent 3,334,674 dated Aug. 8, 1967 gravity opposes such movement.

(e) In Patent 3,221,788 and pending application Ser. No. 401,157 now Patent 3,334,674, dated Aug. 8, 1967 mentioned above, considerable agitation and churning of the incoming sausage batter occurs just before entering the feed ring, and causes unnecessary heat input to the batter. This has been reduced by the provision of additional impeller vanes secured to a rotatable sleeve fixed to the rotating feed ring on the input side of the emulsifier. This improvement assists all incoming batter to possess the same rate of rotation as the feed ring for more effective centrifugal movement into said feed ring, again eliminating additional heat input into the batter.

Other advantages offered by the combination of the vacuum tank with the improved emulsifier of this invention include:

(f) Small size of particles when the shearing in suspension occurs at a rate of millions of such cuts per minute, means that any tiny air bubbles beaten into the batter by a chopper or any similar equipment, must of necessity be near the surface of the particles when these are so unusually small in size. Being near the surface of the particle the tiny air bubbles are substantially all of them then subject to expansion according to the degree of the vacuum when any enclosing layer of material has to be easily frangible upon expansion of the bubble under a vacuum atmosphere.

(g) While not always necessary, the vacuum casing is made as large as 42 inches in diameter to permit a longer flight of the particles with longer exposure of all such air bubbles to the opportunity for expansion and their rupture.

(h) Another practice aiding in the release of those rare larger particles of a size from which all bubbles had not been removed by the vacuum, is the impingement of the particles after flight upon the inner surface of the large casing which has an inevitable tendency to enable any previously unreleased air bubbles to be brought nearer the surface of a particle and released. A still further advantage resides in the fact that after impingement upon the inner surface of the casing cover the particles are all believed to roll along this inner surface toward the lower portion of the casing. This rolling is believed to have a tendency to axially elongate all particles and reduce their diameter for the purpose of releasing any air bubbles not previously exploded.

(i) When the shearing edges of the rotatable and non-rotatable rings become dulled with use they cause a breakdown and oiling out of a portion of the batter emulsion in cooking, through pressure and some heat from the pressure. A simple palliative for this breakdown of the emulsion has been discovered to be productive of a 100% increase in the useful life of the cutting edges before they need to be sharpened. After a prescribed period of operation, by reversing the direction of rotation of the rings and their driving motor, unused shearing edges will be provided as described hreinafter in connection with FIGURE 9.

Referring to the four sheets of drawings:

FIGURE 1 is an outside view of a preferred embodiment of this invention with parts of the lower conical collecting casing broken away.

FIGURE 2 is a longitudinal sectional view of an upper portion of the cover and part of the rings of this emulsifier.

FIGURE 3 is a top view of a small segment of the upper or primary non-rotatable sizing ring.

FIGURE 4 is a plan view of a small segment of the lower or secondary non-rotatable sizing ring.

FIGURE 5 shows a plan view of the rotatable transfer ring which is positioned between the two sizing rings.

FIGURE 6 is a top plan view of a segment of the discharge ring.

FIGURE 7 illustrates a bottom plan view of a segment of the feed ring showing two of the shearing bars.

FIGURE 8 is a view on the line 8—8 in FIGURE 2 looking upward with a portion of the discharge ring broken away to show part of the secondary sizing ring.

FIGURE 9 is a top plan view of a segment of the primary sizing ring with a portion of the transfer ring and taken on the line 9—9 in FIGURE 2.

FIGURE 10 is a view on the line 10—10 of FIGURE 2 looking downward.

FIGURE 11 is a section taken on the line 11—11 in FIGURE 7.

FIGURE 12 is a section on the line 12—12 of FIGURE 7.

The motive power for this comminuting emulsifier includes a 50 horsepower reversible electric motor 10 driving a shaft 11 through belting 12 as shown in FIGURE 1. A four stage comminuting emulsifier of an improved type of that disclosed in FIGURE 8 of Patent 3,221,788 mentioned above, is shown in FIGURE 2 as including three rotatable rings and two non-rotatable sizing rings, which are placed between the rotatable rings. These rotatable rings include the feed or input ring 13 (FIGURE 2), here located at the top of the three rotatable rings mounted on the head 23 which is secured to shaft 11. The sausage batter from a chopper or from a meat mixer, not shown, is supplied by a passageway or pipe 14 entering the axial space or small upper housing or casing 12ª around shaft 11, and below the rotary shaft seal 15 which prevents loss of batter upwardly into or through one of two overhead spaced Timken cone type roller bearings carrying the weight of the shaft, drive pulley and ring assembly. The feed ring 13 in FIGURE 2 is shown as being provided with dotted line feed passageways for the incoming material (see also FIGURES 7, 11, and 12 described hereinafter) to reach the first perforate sizing ring 16. Beneath the upper sizing ring 16 is the transfer ring 17 having perforations shown. The secondary non-rotatable sizing ring 19 is between this transfer ring and the rotatable discharge ring 20 provided with radial discharge slots or recesses 21 (FIGURE 6). A cross bar type spacer 18 (FIGURE 10) and a ring type spacer 22 are clamped with the rotatable rings to the head 23 by bolts or drive pins 24 (FIGURE 2). The several rings including the non-rotatable sizing rings are assembled on head 23 and secured by bolts 24, and then are inserted on the lower end 28 of the shaft 11 with the washer 25, the nut 26, and lock nut 27 tightened on the lower threaded end 28 of the shaft 11. Of course in doing so, care must be given to see that the slotted radially outer portions of the non-rotatable sizing rings are alined to be pushed upward along the ribs 30 which are nearly flush with the inner surface of a ring 54 to which the cover 36 is secured and bolted to a base ring of small upper casing or housing portion 12ª. With the rings all secured on the head 23, mounted on shaft 11, and the feed ring 13 on top, it will be apparent from the drawing that the outer periphery of the rings is closer to an inner surface of a lower part of the ring 54 than was possible in parent Patent 3,334,674, dated Aug. 8, 1967, because, in this case, the discharge ring 20, being on the bottom, there is no necessity for the emulsified material to fall freely between the rings and the emulsifier casing 12ª as was true in said parent patent.

As shown in FIGURE 2 the outer ends of the discharge slots are placed at a level whereby centrifugal force and suction due to the vacuum will assist in pulling the emulsified particles out of the discharge slots 21 along the broken lines 31 into contact with the inner surface of the cover 36 at substantially 90° as shown. Due to the material coming through spaced perforations in the lower sizing ring as well as the discharge slots being angularly spaced, the stream issuing from each of these slots is an almost continuous sheet, but will not be continuous, and will instead be radially spaced groups of particles somewhat as shown. The pipe 32 leading into this large vacuum casing 37 leads to a source 33 of vacuum such as a separately motor driven vacuum pump and to a source of fluid pressure 34, such as a motor driven air pressure pump. The vacuum source should be capable of getting a high vacuum in the large casing having an inside diameter of about 42 inches. The higher the vacuum the better will its purpose of deaerating the sausage particles be achieved. As shown in FIGURE 2 the stream of particles impinges the inner surface of the cover 36 at a right angle as illustrated. This peripheral discharge contact area is about 3½ times greater than the peripheral discharge contact area of casing 15 in my aforementioned parent Patent 2,334,-674 and permits a 3½ times greater product exposure area, thus permitting a corresponding increase of opportunity for air bubbles to explode. The impact of the emulsified small particles upon the inner surface is believed to be effective in rupturing any expanded but unbroken air pockets in the small particles. After such impact the particles may change their shape as a result of the impact and then roll down along the vertical side of the cover 36 and down into the lower collecting portion of this large casing conical portion. After a batch of sausage has been emulsified, the motor driven source of vacuum is stopped and the pressure pump started. Valve 35 is a selector whereby either the vacuum or pressure pump may be connected to the larger casing or housing 37. The pressure pump 34 is for the purpose of assisting in the removal of the deaerated material to another location for stuffing into casings prior to cooking. No spider arms are provided here for loosening any particles tending to stick because the inner surface of this conical casing 37 has been coated with Teflon or nylon lining 38 to provide a smooth surface over which the particles may roll or slide freely with less friction and tendency to stick. It is believed no low surface friction material lining is needed on the inside of the cover 36 since no observed tendency exists for the sausage batter to stick inside this cover. However in event such might occur it is thought a similar plastic lining should then be in order. Should that be done the welding of any parts such as the rib 30 and back up bar 29 to the cover will have to be done before any such lining is put in place.

By lengthening or shortening shaft 11 and the emulsifier casing, the rings may be placed at a height to have the discharge ring 20 low enough to impinge the cover whenever desired. In rolling along the inside of the cover the fine particles are believed to be elongated with a reduction in diameter.

A valve 39 at the base of the large conical casing portion 37 permits the discharge of the deaerated sausage particles through a pipe 39a preferably under air pressure as described in my parent Patent 3,334,674 to wherever needed before being cooked. In FIGURE 1 this casing is shown as being mounted on legs 40. The casing cover 36 may be clamped in closed position by clamps 41 or otherwise to permit quick access for cleaning.

In FIGURE 3 the primary non-rotatable sizing ring 16 is provided with 56, ½ inch drill holes having centers spaced 6° apart, the outer circles have their centers on a 4½ inch radius while the inner ones have their centers on a 4¹¹⁄₁₆ inch radius. In alignment with a rib recess center line there is only one hole on the inner row of hole centers and the first hole on each side of that is on the outer row having their centers 12° away from the rib recess center line.

In FIGURE 4 is shown the arrangement of holes in a segment of the secondary or lower non-rotatable sizing ring 19. There are 142 holes each made by a ⁵⁄₁₆ inch drill, with the centers of said holes spaced 5° between centers and two holes being on each center line. The inner row of holes have their centers at 3¹³⁄₁₆ inch radius from the center of the ring. The next outer circles have holes with their centers 4³⁄₃₂ inches from the center axis. The third and fourth rows of holes are radially aligned with the first and second rows respectively and have their centers 4⅜ inches and 4⅝ respectively from the ring center. The exact locations for the holes is secondary to their being arranged in an orderly manner and able to be in approximate alignment for the edges of the holes or recesses above and below them.

The segment of the transfer ring 17 is shown in FIGURE 5. This ring has 90 holes made by a drill ¹³⁄₃₂ inch in diameter. The innermost row of holes have their centers 3¹³⁄₁₆ inches from the center of the ring. The second or middle row of holes have their centers 4³⁄₁₆ inches from the center of the ring, while the outermost row of holes have their centers 4½ inches from the ring center. This ring has 4 holes 42 for the clamping bolts or drive pins and each is of a size made by a ⁴¹⁄₆₄ inch drill.

The discharge ring 20 shown in FIGURE 6 has 4 holes for the clamping bolts not shown and has 120 slots or recesses 21 spaced 3 degrees between radial centers. Each slot is about 1¾ inches in radial length; about ⁷⁄₃₂ of an inch in depth; and has a circumferential width of about one-eighth of an inch.

Ejection of the finished emulsion from discharge ring 20 is better and more widely dispersed and more positive than discharge from the "impeller" 75 of my parent Patent 3,334,674, due to the close spacing of the 120 discharge slots in ring 20 and the positive pumping action they deliver. This permits a more favorable exposure of finished emulsion particles to the vacuum atmosphere thus making possible a more efficient removal of microscopic air bubbles with less heating of the batter previously.

The feed ring segment shown in FIGURE 7 is viewed from the bottom looking upward with this ring removed. There are four thick walled shearing bars 45 each of which is provided with a hole 42 for a clamping bolt, and a shorter shearing bar 46 each midway between the shearing bars 45. The shearing bar 46 is not shown in FIGURE 2 but it extends radially inward far enough to be able to bridge all the perforations in the primary sizing ring 16. Thus the input of material into the feed ring 13 may occur in a space nearly 90 degrees wide, but radially outwardly of, and in the spaces over the upper sizing ring, the spaces for the radial feed of material are nearly 45 degrees wide.

In this invention, high speed rotation of the batter is effected before the product is finished. Finishing occurs as the batter passes down through the cutting ring assembly while it is being cut at a rate of almost 67 million times per minute.

The finished emulsion is then discharged, without further working (not the case in my parent Patent 3,334,674 and in Patent No. 3,221,788, dated Dec. 7, 1965) into the vacuum atmosphere of the housing or casing and flows, by gravity, to the lower end of the chamber where it is transferred out of the chamber by means of a very low air pressure during the pressure portion of the operating cycle. FIGURE 10 shows segment of a cross bar spacer 18 which mates with primary sizing ring 16 and which also has input impeller vanes 44. This spacer 18 operationally keeps the feed ring 13 and the transfer ring 17 from contact with sizing ring 16. The spacing pad area adjacent the clamping bolt holes 42 is thicker than the non-rotatable upper sizing ring 16 by from about 0.001 to .005 of an inch so as to leave from at least 0.0005 to less than 0.0025 of an inch clearance on each side of this sizing ring during operation. During an inoperative period the sizing ring 16 is free to rest on the rotatable transfer ring below it, but during operation sizing ring 16 is lifted off the ring on which it was resting by a thin film of sausage batter which is of approximately the same thickness on each side of the floating non-rotatable sizing rings. This spacer 18 has a central hole 43 which permits it to be slipped over the drive shaft. Upstanding from this spacer upper surface are four impeller vanes 44 which are in the plane of the shaft axis and are normal to the planes of said rings 13, 16, 17, etc. and impart to the incoming material a circular motion in phase with the rotatable feed ring 13 thus producing a high centrifugal component, facilitating its entry into the feed ring 13. The impeller vanes 44 are vertically disposed and extend upward for a substantial distance as shown in FIGURE 2 or almost 1½ inches, permitting rotation of the ring assembly in either direction. This dual rotation feature doubles the period between ring surface grinding, described below, which restores original shearing sharpness to the edges of all holes and all slots of rings in the emulsifier ring assembly. Dual rotation of the emulsifier ring assembly of my parent Patent 3,334,674, is not feasible because impeller vanes 66 are pitched for rotation in only one direction. Similarly, dual rotation of the emulsifier ring assembly of my Patent No. 3,221,788 is not feasible because:

(a) Impeller vanes 27, FIGURES 8, 10 and 11 are pitched for rotation in only one direction.

(b) Discharge vanes 61, FIGURES 8, 16, are inclined to discharge finished emulsion in only one direction.

(c) Discharge pipe 32, FIGURES 15, 16, is tangentially positioned to receive finished emulsion from discharge vanes rotating in only one direction.

Prior to this invention being completed it was thought the four input impeller vanes 44 (FIGURE 10) were adequate to satisfy their purpose in creating a rotary motion to the incoming batter to facilitate its entry into the feed ring. But considerable churning movement of the batter was observed on close inspection. This indicated to me the rotational movement of the batter was probably not exactly in phase with vanes 44 and their cross-bar type spacer support 18 because knowing the high viscosity and friction incident to batter moving over any stationary surface, the generation of heat from friction and lost motion was suspected. For this reason a rotatable sleeve 51 was clamped by bolts 24 to the feed ring 13 and spaced closely to and only a very short distance from the stationary wall around the shaft 11 and below the batter input passageway 14 as shown in FIGURE 2. Additional impeller vanes 52 projecting radially inward from sleeve 51 were spaced about 45° from the vanes 44 to insure better rotation for the batter contiguous to the sleeve 51. Less lost motion of the batter was observed and it was thought rotation of substantially all portions of the batter was given adequate rotation to facilitate centrifugal entry into the feed ring with less friction, less loss of power and with less internal heating of the batter.

In FIGURE 8 is shown a view from below the discharge ring 20 and looking upward to show rib 30, only about as long axially as the two sizing rings 16 and 19 for engaging notches in these sizing rings. A back-up bar 29 of short length and depth is preferably welded to the cover 36 of the large casing and to said rib 30, which is also welded to cover 36.

In FIGURE 9 is shown a top plan view of a narrow segment of the upper or primary sizing ring 16 with the transfer ring 17 and its perforations. Only these two rings are sufficient to show that when ring 17 is moving in a clockwise direction as shown by the upper arrow A, the shearing edges of any hole in each of rings 16 and 17 are at locations 47 and 48 respectively. After prolonged use of 3 to 6 weeks or more, these edges become worn or rounded as will be apparent if excessive amounts of fatty oil are observed to be released during the cooking cycle. Dull or rounded edges of these holes have a tendency to crush rather than cleanly shear the product. Under this condition, ring surface grinding to restore the sharp hole edges would be required if the single direction rotation of my prior patent and also of my parent Patent 3,334,674 dated Aug. 8, 1967, were in use. With this invention it has been discovered that another equally long period of use is possible before surface grinding is necessary by merely reversing direction of the driving motor 10, to drive the emulsifying ring assembly, including ring 17 in the direction of arrow B, whereby new and unused edges 49 and 50 in the sizing ring 16 and transfer ring 17 together with all rings in the emulsifier ring assembly, become available for use for another 3 to 6 weeks or more, thus doubling the time between needed surface grinding or sharpening the shearing edges. Not only that, but the effort in sharpening after doubling the weeks of wear is no greater than sharpening after the former 3 to 6 weeks of service, and one grinding will entirely restore all hole edges for each ring face of each of the 3 inner rings, plus one inner face for each of the feed ring 13 and the discharge ring 20. The sleeve 51 has a flange 53 by means of which it is clamped in place by means of the bolts 24. When this sleeve 51 is of a low friction type plastic such as Teflon or nylon, it may be safely mounted close enough to the inner face of the small upper casing portion 12$^a$ to reduce substantially all danger of the batter leaking between the inner face of casing 12$^a$ and the sleeve 51.

The spacer ring 22 is of the type shown in FIGURE 12 of my Patent 3,221,788 and is ground to a thickness which must exceed the thickness of secondary sizing ring 19 by .001 inch to .005 inch.

The number of shearings per minute possible with this invention operating at 1890 revolutions per minute is computed as follows:

```
8 cutting bars 45 and 46 in the feed
   ring, 56 perforations in the upper
   sizing ring, therefore the recess or
   perforations passed over in 1 revo-
   lution of the drive shaft _____   8×56=    448
56×90 (holes in transfer ring) _____  56×90=  5,040
90×142 (holes, lower sizing ring) ___  90×142=12,780
142×120 (discharge slots) _____  120×142=17,040
```

Possible shearings per revolution _____ 35,308
At 1890 r.p.m. _____ 1890×35308=66,732,120
Possible opportunities for shearing in suspension at 1750 r.p.m. _____ 61,789,000

The vacuum casing should be of a size to contain the usual batch being handled. This seems to vary with the meat packer and may be between 200 pounds to 800 pounds. Coming from a chopper after a 4 minute chopping period the raw sausage emulsion will have a density of about .90 to .93 due to aeration caused by the chopper, but after being emulsified and deaerated by this invention the density will be raised to about 1.01 to 1.03, which is heavier than water. The sausage treated by this invention has been found to possess a slightly larger ability to retain fat within the prescribed limits set for meat packers by the Meat Inspection Division of the U.S. Department of Agriculture. This slight but economically important increased use of fat often improves the taste and flavor of emulsion types of sausage.

The use of a centrifugal distributor of the type disclosed in my Patent 3,189,939 dated June 22, 1965 required a small amount of power for its driving motor of around 3 horsepower, so that the power reduction for the driving motor 10 was not due to elimination of the distributor disc alone but to other factors which have been mentioned herein as including principally the high friction output impellers 61 in FIGURE 16 of Patent 3,221,788. The motive power for the vacuum and for the air pressure pumps are independent of that required for the emulsifier.

The emulsifier rings need to be spaced axially between about 0.0005 and less than about 0.0025 of an inch on each side of a sizing ring during operation inasmuch as some types of bologna and weiner materials were found to contain tendinous strings which stopped emulsifier operation when the spacing was as much as 0.005 of an inch.

With the upper sizing ring having holes of much larger diameter than does the lower or secondary non-rotatable sizing ring it will be appreciated that the estimate of one shearing per pair of holes in registry may be unduly conservative, because more than one piece of material may pass through and be cut by the edges of a pair of holes. Also each shearing usually produces two pieces of material. On the other hand in starting, the material to be sheared may require one or a few revolutions of the drive shaft to get the material through all perforations and recesses.

The angle of incidence for the emulsified and deaerated sausage particles upon an inner surface of the cover 36 is believed to have little or no tendency to flatten such particles and more of a tendency to cause such tiny particles to roll in a stream along the inner surface of the casing and become elongated with a reduction in diameter.

Terms such as "immediate" and "instantaneous" should not be construed as involving so short a time as to make the centrifugal distributor 75 in my parent Patent 3,334,674 useless and especially with weaker permissible vacuum pressure.

The shearing rings should have a hardness of Rockwell C61 to C63 for a substantial period of usefulness. Speeds of 1890 to 1750 r.p.m. have been used, the higher speed producing smaller particle sizes with the same apparatus and batter deaeration.

One of the more important single features in the use of this combination is believed to be the release of superfine particle sizes in the finished emulsion. The smaller the particle size the nearer must a tiny air pocket be to the surface of the particle, and the easier should be its expansion and removal in a vacuum. This inventor is without equipment for determining an average size of the particles, however, since 300 pounds of sausage from a chopper is easily deaerated and emulsified in one minute, and assuming that all the opportunities are utilized for shearing and no more than those opportunities were taken, it is believed that a conservative estimate of the weight of a particle of sausage may be as follows:

When raw sausage batter is emulsified at a rate of 300 pounds per minute by passing it through the emulsifier ring assembly rotating at 1890 r.p.m., .1587 pound will be discharged for each revolution.

$$\left(\frac{300}{1890}=.1587\right)$$

This amounts to a discharge of .00044 pound for each 1 degree of rotation.

$$\left(\frac{.1587}{360}=.00044\right)$$

which equals 3.08 grains (.00044×7000=3.08 grains). With such extremely fine dispersion followed by instantaneous impingement of these particles around the 132 inch inner circumference of the vacuum chamber wall, it can be more readily understood why almost complete deaeration of the finished emulsion is so easily accomplished with only a 25 or 26 inch vacuum.

No suitable apparatus for accurately measuring the thermal conductivity of a sausage batter before or after being cooked is immediately available. The conclusion of improved thermal conductivity is mentioned here chiefly because in no other reasonable manner may the shorter cooking time and shorter cooling times be explained. It has been found that deaeration makes possible shorter heating and shorter cooling periods which can vary from 15% to 25% by making the sausage more thermally conductive.

The following Table I discloses the amount of air which can be incorporated into a 600 pound batch of raw sausage emulsion by chopping about 5 minutes.

TABLE I

| Emulsion Density | .9 | .95 | 1.00 | 1.01 | 1.02 | 1.03 | 1.04 |
|---|---|---|---|---|---|---|---|
| Volume (cu. ft.) of entrapped air in 600 pounds emulsion at various densities. | 1.44 | .88 | .37 | .28 | .18 | .09 | 0 |

The following Table II discloses the volumetric displacement of 600 pounds of raw emulsion of various densities at atmospheric pressure.

TABLE II

| Emulsion Density | .9 | .95 | 1.00 | 1.01 | 1.02 | 1.03 | 1.04 |
|---|---|---|---|---|---|---|---|
| Volume (cu. ft.) of 600 pounds raw emulsion under atmospheric pressure at various densities. | 10.68 | 10.12 | 9.62 | 9.52 | 9.43 | 9.34 | 9.25 |

It is known that almost microscopic pockets of air are beaten into raw sausage batters by the conventional chopper before further emulsification and comminution. These tiny air pockets, because of their small size, have been difficult to release unless the emulsified sausage is extremely finely comminuted and exposed on all sides of each particle to a vacuum of at least about 24 inches or more of mercury. Heretofore vacuumization has been accomplished by means of a conventional meat vacuum mixer having an air tight cover while maintaining the desired vacuum within the mixer. Such practice is not commonly used by sausage manufacturers because of some of the following objections: (1) additional labor and equipment is needed to perform such vacuum mixer treatment; (2) considerable heat gets into the sausage due to mechanical mixing; (3) upgrading of the sausage formula was necessary to overcome loss of product stability due to the aforementioned heat input and over working of the finished emulsion; (4) minutes of valuable manufacturing time were required for this vacuum treatment.

These problems and difficulties are only a portion of those which have existed for many decades without there being any satisfactory proposal for reducing heat input to the sausage or for deaerating it in as satisfactory a manner as has now been made available by this invention.

This invention enables a sausage manufacturer to vacuumize a finished emulsion without any objectionable loss of time, without injurious heat input into the product, without the need or necessity to upgrade the sausage formula, and without the need for extra labor. Under a 25 inch vacuum every air bubble within the emulsion batter is expanded about 6 times its atmospheric volume. Under such vacuum exposure almost every air bubble in the extra finely comminuted sausage emulsion will explode if properly exposed. The design and efficiency of the emulsifier discharge ring of this invention makes possible an overwhelming exposure of the product to the vacuum atmosphere resulting in raising the specific gravity of the raw sausage emulsion from about .90 to 1.00 or more and even up to 1.03. Deaeration is responsible for this increase in density. It necessarily follows that no emulsion should be introduced into the vacuum tank until at least 25 inches of vacuum has been developed if proper deaeration is to be accomplished. The higher the degree of vacuum the easier microscopic air bubbles explode.

By the stages of an apparatus for shearing in suspension is meant the number of spaces between rotatable and non-rotatable ring members. For example that shown in FIGURE 2 is a four stage comminuting emulsifier.

Apparatus for shearing in suspension may be embodied in numerous forms as exemplified in my Patent 3,221,788.

A simple manually operated apparatus for shearing in suspension is attainable by placing a thin washer around a pivot of the blades in an ordinary pair of scissors to keep them out of actual wiping contact.

The manner in which the illustrated apparatus may be taken down for cleaning involves first removing nuts 26 and 27 from the shaft 11, then removing the five rings by drawing them downward from off shaft 11 as a unit, and finally releasing the bolts 24 to separate the rings for washing following their removal. After cleaning such rings in ways well known in the art they are reassembled in the reverse of the above manner. Finally a suitable jig for holding and raising or lowering the assembled rings for sliding them onto or off of the shaft 11 and tightening nuts 26 and 27, clamping washer 25, completes the operation.

A 50 horsepower electric motor for driving this emulsifier is larger than is needed for continuous operation. In the intermittent operation in the usual plant today it is the frequent starting under overloaded condiions before full speed has been attained that makes a 50 horsepower desirable. Where continuous operation is planned a 40 horsepower high torque motor for starting should operate satisfactorily.

A few facts upon which a finding of this invention being non-obvious to those skilled in the manufacture and selling of sausage emulsion products at the time the present inventions were made should be in order. These include:

(1) The most outstanding element of the present is believed to be that of the emulsifier first shown in Patent 3,221,788, which for the first time filled an old need of a great many years standing and well over half a century that has provided the emulsified sausage making industry with the ability to have a superfinely emulsified product in a simple and efficient manner without the use of coolants and without the objectionable high mechanical heat input possessed by the usual shearing type comminuting emulsifiers.

(2) This element of the present improvement was an essential to the emulsifier and vacuum casing combination of this invention at the time the present invention and its parent Patent 3,334,674 was made as required by the patent statute Section 103.

(3) Lacking the ability to obtain the superfinely comminuted and emulsified batter, it follows that no one previously appreciated how the passage of such unusually small particles through a vacuum would cause better densities to be obtained without the high time and labor previously involved and with such good results when the tiny air pockets were more easily removed when said air pockets were nearer the surface, the smaller the particle size of the sausage meat or other material to be deaerated.

(4) A decisive factor has been said to be the fact that there were hundreds and probably thousands of ordinarly skilled workers engaged in the preparation of sausage and other products needing to be deaerated, who should have seen these advantages had they been obvious to them long ago.

I claim:

1. In an emulsifying apparatus for shearing in suspension particles of sausage batter and other materials, said apparatus including at least two radially recessed rotatable rings, a shaft on which said rings are mounted, at least one non-rotatable perforate sizing ring between and generally concentric with said rotatable rings, a motor for driving said shaft, one of said rotatable rings being a feed ring having generally radial passageways through which batter may be moved centrifugally, the radial outer ends of said passageways being closed against the peripheral egress of batter while the radial inner ends of said passageways are open, said feed ring passageways being open toward and adjacent said sizing ring perforations for batter particles to be sheared without continual rubbing contact of the shearing edges of said perforations and passageways, another of said rotatable rings being a discharge ring having passageways axially open toward said sizing ring and into which sizing ring perforations may discharge batter for further shearing in suspension, the radial inner ends of the slots in the discharge ring being closed while their radial outer ends are open for centrifugal discharge of batter moved into said slots as they move across perforations in said sizing ring under centrifugal pressure, the axial separation between said rings being small enough during operation to retain the batter against leaking out peripherally between said rings to any substantial extent during operation and a supply passageway for leading batter to said feed ring, the combination therewith of the improvement for better preparing the sausage batter prior to cooking by enhancing the stability of the emulsion to prevent the content from being oiled out during cooking as a result of mechanically applied heat input thereto prior to cooking, said last mentioned improvement including said emulsifier being located in part in a large vacuum housing with said discharge ring having its centrifugal discharge of batter augmented by a suction effect upon the batter due to a substantial vacuum in said housing resulting in said emulsifier discharge ring discharging batter directly well out into said large housing for a free and unimpeded flight of many inches in a vacuum to effect expansion and release of air particles from tiny particles of batter and said batter being caused to impinge first a wall of said housing remote from said emulsifier to effect a rolling along an inner wall surface of said housing with reduction in diameter of the batter particles.

2. Apparatus according to claim 1 in which said shaft is upstanding whereby gravity may assist centrifugal force at least to some extent in moving batter through a sizing ring.

3. Apparatus according to claim 1 in which the suction is that caused by a vacuum of about 25 inches of mercury and the centrifugal thrust is of the order of that resulting when a 9½ inch discharge ring is rotated at a speed of about 1750 revolutions per minute.

4. Apparatus according to claim 1 in which impeller vanes are mounted adjacent the feed ring and are upstanding forming an angle of 90 degrees to the plane of said ring whereby said rotatable rings may rotate in either direction.

5. Apparatus according to claim 1 in which the degree of comminution of the batter particles is effected by many millions of opportunities for shearings in suspension per minute and the vacuum is sufficient to expand many air particles causing them to be released raising the density of the batter to well over unity and raising the thermal conductivity to an amount such that the danger of "oiling out" is greatly reduced.

6. Apparatus according to claim 1 in which a sleeve is located adjacent the walls of a passageway for incoming batter and extends into such passageway for a short distance and is connected to rotate with said shaft and rings, to reduce friction between the batter and the walls of such a passageway, and impeller vanes are connected to said shaft to rotate batter within said sleeve at an angular velocity closely adjacent that of said sleeve.

7. Apparatus according to claim 6 in which the outer surface of said sleeve is of a smooth low friction material juxtaposed to the inner surface of the passageway leading batter to said rings.

8. Apparatus according to claim 1 in which said driving motor is reversible for prolonging the life of edges effective for shearing batter in suspension without substantial mechanical heat input to the batter.

9. In an emulsifying and comminuting apparatus of the type for shearing in suspension particles of sausage batter and the like at a rate of many such cuts per minute and including a rotatable and recessed feed ring surrounding an input passageway radially within said ring, a non-rotatable perforate sizing ring closely adjacent to but not in direct continual shearing contact with said feed ring, input impeller vanes rotatable with said input passageway, the combination therewith of the improvement for enhancing stability of the emulsion by reducing the mechanical heat input to the batter, said improvement including said impeller vanes being more than four and large enough in number to cause the incoming batter to rotate at substantially the same rate as said feed ring, a rotatable sleeve within and around said input passageway, means for rotating said feed ring, sleeve, and a substantial portion of said vanes, and means for reversing the direction of rotation of said feed ring, sleeve, and vanes.

10. In a comminuting and emulsifying apparatus for sausage batter and other material, said apparatus including at least two coaxial and recessed rotatable rings, a non-rotatable perforate sizing ring between said rotatable rings, said sizing ring having perforations, one of said rotatable rings being a feed ring having radial recesses open at their inner ends and closed at their outer ends but axially open to allow centrifugal discharge of batter through said sizing ring perforations, said rings being closely spaced to preclude loss of substantial amount of batter radially outward between said rings yet axially separated, another of said rotatable rings being a discharge ring having radial recesses open at their outer ends and closed at their inner ends and open axially for receiving discharge of batter from said sizing ring and centrifugally hurling batter particles outwardly, a large vacuum housing around said discharge ring, a drive shaft for at least said feed and discharge rings, a supply passage around said shaft and within said feed ring, impeller vanes radially secured for rotation with said shaft for imparting angular movement to said batter to direct it into the feed ring recesses by centrifugal force, shearing in suspension occurring as the edges of the rotatable feed ring recesses pass across the edges of the sizing ring perforations, and a small housing enclosing an axial passageway adjacent said feed ring, the combination therewith of the improvement for preparing batter for cooking by enhancing stability of the batter against the emulsion breaking down and oiling out during cooking due to pressure and mechanical heat input to the batter as the shearing edges become dulled with use whereby the periods of use for the emulsifying apparatus between shut-downs for grinding and sharpening said shearing edges is substantially doubled, said improvement comprising means for reversing at least the direction of rotation of said drive shaft, in order to double the number of effective shearing edges available.

11. Apparatus according to claim 10 in which said discharge ring is on said shaft in shearing-in-suspension relation to a sizing ring, and means for vacuumizing said large housing to better condition the batter for cooking by enhancing its thermal conductivity with its deaerating of tiny air bubbles and increasing the density of the batter.

12. In an emulsifier apparatus for shearing in suspension particles of sausage batter and other materials, said apparatus including at least two radially recessed rotatable rings, a shaft on which said rings are mounted, at least one non-rotatable perforate sizing ring between and generally concentric with said rotatable rings, a motor for driving said shaft, one of said rotatable rings being a feed ring having generally radial passageways through which batter may be moved centrifugally, the radial outer ends of said passageways being closed against peripheral egress of batter while the radial inner ends of said passageways are open, an input impeller on said shaft having vanes generating substantial angular movement of batter as it reaches the feed ring passageways and their openings at their radial inner ends, another of said rotatable rings being a discharge ring having open slots into which sizing ring perforations may discharge batter, the radial inner ends of the slots in the discharge ring being closed while their radial outer ends are open for centrifugal discharge of batter moved into said slots as they pass across perforations in said sizing ring under centrifugal pressure, the axial separation between said rings being small enough during operation to retain the batter against leaking out peripherally from between said rings to any substantial extent during operation, and a supply passageway for leading batter to said feed ring, the combination therewith of the improvement for better preparing the sausage batter prior to cooking by enhancing the stability of the emulsion to prevent the content from being oiled out during cooking as a result of mechanically applied heat input thereto, said improvement including the discovery that a substantial heat input had occurred in the emulsified batter by an output impeller and by friction in a passageway for batter from the emulsifier en route to a large vacuum treatment housing, and a further improvement for eliminating much of such mechanical heat input, said last mentioned improvement including said emulsifier being located at least in part in said large vacuum housing where it may receive the output of a chopper and the discharge ring of said emulsifier discharging batter directly into said large vacuum housing whereby no output impeller for moving batter from another emulsifier through a passageway of substantial length is necessary, and a small housing around at least said feed ring and into which said supply passageway leads.

13. Apparatus according to claim 12 in which said discharge ring centrifugally discharges the batter directly well out into said large housing for a distance of many inches and to impinge a wall of said large housing remote from said ring under a centrifugal force at least effective as that approximating that from a discharge ring 9½ inches in diameter rotating at a speed of 1750 revolutions per minute and whereby no additional and separate discharge impeller located below and of larger diameter is needed.

14. In an emulsifier apparatus for shearing in suspension particles of sausage batter and other materials, said apparatus including at least two radially recessed rotatable rings, a shaft on which said rings are mounted, at least one non-rotatable perforate sizing ring between and generally concentric with said rotatable rings, a motor for driving said shaft, one of said rotatable rings being a feed ring having generally radial passageways through which batter may be moved centrifugally, the radial outer ends of said passageways being closed against peripheral egress of batter while the radial inner ends of said passageways are open, said radial passageways having axial openings through which batter enters the sizing ring perforations, an input impeller on said shaft having vanes generating substantial angular movement of batter as it reaches the feed ring passageways and their openings at their radially inner ends, another of said rotatable rings being a discharge ring having open slots into which sizing ring perforations may discharge batter, the radial inner ends of the slots in the discharge ring being closed while their radial outer ends are open for centrifugal discharge of batter moved into said slots as they pass across perforations in said sizing ring under centrifugal pressure, the axial separation between said rings being small enough during operation to retain the batter against leaking out peripherally from between said rings to any substantial extent during operation, a supply passageway for leading batter to said feed ring and forming a small axial housing around said shaft and radially within at least said feed ring, said emulsifier being located in a large vacuum housing far enough for said discharge ring to be able to discharge batter directly and centrifugally into said large vacuum housing, the combination therewith of the improvement for reducing mechanical heat input to the batter in said small housing before entering said feed ring, said improvement including a sleeve secured to said rotatable rings and shaft and extending axially away from said rotatable rings to reduce friction of rotating batter were it to rotate against more of a radially inner wall of said small housing, and radially disposed impeller vanes driven by said shaft enabling said rotating rings to be reversible for prolonging the life of said rings before sharpening.

15. Apparatus according to claim 14 in which the number and size of said radial impeller vanes is sufficient to effect axial rotation of said batter at substantially the angular velocity of a radially inner surface of said rotatable rings.

16. Apparatus according to claim 14 in which said sleeve is formed with a radially outer surface juxtaposed to a radially inner surface of said small housing and the radially outer surface of said sleeve is of low friction smooth material.

17. An apparatus according to claim 1 in which the centrifugal force in the discharge ring has been discovered when combined with the suction due to the vacuum in said housing to be sufficient to enable a centrifugal impeller spaced below said rings to be unnecessary.

References Cited

UNITED STATES PATENTS

| | | | |
|---|---|---|---|
| 2,321,599 | 6/1943 | Hofmann | 241—257 |
| 2,425,912 | 8/1947 | Appel et al. | 146—78 |
| 3,006,614 | 10/1961 | Beach | 241—257 X |
| 3,147,784 | 9/1964 | Sloan | 146—192 |
| 3,215,535 | 11/1965 | Schmook et al. | 146—192 X |
| 3,334,674 | 8/1967 | Hughes | 146—192 |
| 1,560,766 | 11/1925 | Crites | 241—186 X |

W. GRAYDON ABERCROMBIE, Primary Examiner